(12) United States Patent
Havemose

(10) Patent No.: US 9,223,671 B2
(45) Date of Patent: Dec. 29, 2015

(54) METHOD AND SYSTEM FOR PROVIDING HIGH AVAILABILITY TO COMPUTER APPLICATIONS

(71) Applicant: Red Hat, Inc., Raleigh, NC (US)

(72) Inventor: Allan Havemose, Arroyo Grande, CA (US)

(73) Assignee: Red Hat, Inc., Raleigh, NC (US)

( * ) Notice: Subject to any disclaimer, the term of this patent is extended or adjusted under 35 U.S.C. 154(b) by 23 days.

(21) Appl. No.: 14/463,859

(22) Filed: Aug. 20, 2014

(65) Prior Publication Data

US 2014/0359354 A1    Dec. 4, 2014

Related U.S. Application Data

(63) Continuation of application No. 13/866,431, filed on Apr. 19, 2013, which is a continuation of application No. 13/229,864, filed on Sep. 12, 2011, now Pat. No. 8,458,534, which is a continuation of application No. 12/334,651, filed on Dec. 15, 2008, now Pat. No. 8,037,367, which is a continuation of application No. 11/213,678, filed on Aug. 26, 2005, now Pat. No. 8,122,280.

(60) Provisional application No. 60/605,026, filed on Aug. 26, 2004.

(51) Int. Cl.
| | |
|---|---|
| *G06F 11/00* | (2006.01) |
| *G06F 11/30* | (2006.01) |
| *G06F 11/14* | (2006.01) |
| *H04L 29/12* | (2006.01) |
| *G06F 11/20* | (2006.01) |

(52) U.S. Cl.
CPC ............ *G06F 11/30* (2013.01); *G06F 11/1412* (2013.01); *G06F 11/1438* (2013.01); *G06F 11/1482* (2013.01); *G06F 11/2002* (2013.01); *H04L 61/2007* (2013.01); *G06F 11/203* (2013.01); *G06F 11/2023* (2013.01); *G06F 11/2028* (2013.01)

(58) Field of Classification Search
CPC ............ G06F 11/1412; G06F 11/0757; G06F 11/0793; G06F 11/1471; G06F 11/1438
USPC ...................................... 714/15, 55
See application file for complete search history.

(56) References Cited

U.S. PATENT DOCUMENTS

| | | |
|---|---|---|
| 5,748,882 A | 5/1998 | Huang |
| 5,774,660 A | 6/1998 | Brendel et al. |
| 5,951,650 A | 9/1999 | Bell et al. |
| 5,996,016 A | 11/1999 | Thalheimer et al. |

(Continued)

OTHER PUBLICATIONS

Juergen Haas, from Binh Nguyen, Hacking-Lexicon/Linux Dictionary retrieved from http://linux.about.com/cs/linux101/g/hook.htm (Retrieved on Oct. 22, 2012).

(Continued)

*Primary Examiner* — Yair Leibovich
(74) *Attorney, Agent, or Firm* — Haynes and Boone, LLP

(57) ABSTRACT

A system and method for distributed fault detection. In an exemplary method, unplanned application exits and crashes may be detected at a node local level. Further, application hangs may be detected using at least one of a script and a binary at the node local level. Also, node crashes and operating system crashes may be detected using node to node heartbeating.

19 Claims, 3 Drawing Sheets

(56) References Cited

U.S. PATENT DOCUMENTS

| | | | |
|---|---|---|---|
| 6,021,408 | A | 2/2000 | Ledain et al. |
| 6,026,499 | A | 2/2000 | Shirakihara et al. |
| 6,105,148 | A * | 8/2000 | Chung et al. .................. 714/16 |
| 6,154,877 | A | 11/2000 | Ramkumar et al. |
| 6,161,219 | A | 12/2000 | Ramkumar et al. |
| 6,484,276 | B1 | 11/2002 | Singh et al. |
| 6,496,979 | B1 | 12/2002 | Chen et al. |
| 6,618,839 | B1 | 9/2003 | Beardslee et al. |
| 6,629,266 | B1 | 9/2003 | Harper et al. |
| 6,678,369 | B2 | 1/2004 | DeMent et al. |
| 6,718,538 | B1 | 4/2004 | Mathiske |
| 6,823,474 | B2 | 11/2004 | Kampe et al. |
| 6,854,069 | B2 | 2/2005 | Kampe et al. |
| 6,954,784 | B2 | 10/2005 | Aiken, Jr. et al. |
| 7,089,294 | B1 | 8/2006 | Baskey et al. |
| 7,096,388 | B2 | 8/2006 | Singh et al. |
| 7,152,119 | B2 | 12/2006 | Na et al. |
| 7,219,255 | B2 | 5/2007 | Khalil et al. |
| 7,228,453 | B2 | 6/2007 | O'Brien et al. |
| 7,234,072 | B2 | 6/2007 | Esfahany |
| 7,243,262 | B2 | 7/2007 | Mukherjee et al. |
| 7,246,256 | B2 | 7/2007 | De La Cruz et al. |
| 7,251,745 | B2 | 7/2007 | Koch et al. |
| 7,275,106 | B1 * | 9/2007 | Bean et al. .................. 709/227 |
| 7,293,200 | B2 | 11/2007 | Neary et al. |
| 7,366,949 | B2 | 4/2008 | Buskens et al. |
| 7,401,256 | B2 | 7/2008 | Ishida |
| 7,509,630 | B2 | 3/2009 | Buskens et al. |
| 7,536,591 | B2 | 5/2009 | Varadarajan et al. |
| 7,552,239 | B2 | 6/2009 | Jean et al. |
| 7,577,720 | B2 | 8/2009 | Vertes et al. |
| 7,725,763 | B2 | 5/2010 | Vertes et al. |
| 7,783,914 | B1 | 8/2010 | Havemose |
| 7,941,552 | B1 | 5/2011 | Protassov et al. |
| 8,176,364 | B1 | 5/2012 | Havemose |
| 8,307,134 | B2 | 11/2012 | Galloway et al. |
| 8,402,305 | B1 | 3/2013 | Havemose |
| 8,458,534 | B1 | 6/2013 | Havemose |
| 8,726,078 | B1 | 5/2014 | Havemose |
| 2002/0007468 | A1 | 1/2002 | Kampe et al. |
| 2002/0049845 | A1 | 4/2002 | Sreenivasan et al. |
| 2002/0124089 | A1 | 9/2002 | Aiken et al. |
| 2002/0169884 | A1 | 11/2002 | Jean et al. |
| 2003/0014684 | A1 | 1/2003 | Kashyap |
| 2003/0028635 | A1 | 2/2003 | DeMent et al. |
| 2003/0037289 | A1 | 2/2003 | Singh et al. |
| 2003/0069993 | A1 | 4/2003 | Na et al. |
| 2004/0006550 | A1 | 1/2004 | Upton |
| 2004/0210895 | A1 * | 10/2004 | Esfahany .................. 717/174 |
| 2004/0268175 | A1 | 12/2004 | Koch et al. |
| 2005/0050304 | A1 | 3/2005 | Mukherjee et al. |
| 2005/0060722 | A1 | 3/2005 | Rochette et al. |
| 2005/0172161 | A1 | 8/2005 | Cruz et al. |
| 2005/0223302 | A1 | 10/2005 | Bono |
| 2005/0251785 | A1 | 11/2005 | Vertes et al. |
| 2005/0262381 | A1 | 11/2005 | Ishida |
| 2005/0262411 | A1 | 11/2005 | Vertes et al. |
| 2006/0085679 | A1 | 4/2006 | Neary et al. |
| 2006/0090097 | A1 | 4/2006 | Ngan et al. |
| 2006/0143512 | A1 | 6/2006 | Jia et al. |
| 2007/0107052 | A1 | 5/2007 | Cangini et al. |
| 2007/0226460 | A1 | 9/2007 | Tomkins et al. |
| 2007/0277056 | A1 | 11/2007 | Varadarajan et al. |

OTHER PUBLICATIONS

Hooking, retrieved from http://en.wikipedia.org/wiki/Hooking (Retrieved on Oct. 22, 2012).

H.Nam, Probabilistic Checkpointing, Jul. 2002, IEICE Trans. INF & SYST., vol. E85-D, pp. 1-12.

J. Sancho, On the Feasibility of Incremental Checkpointing for Scientific Computing, Apr. 2004, IEEE, Proceedings of the 18$^{th}$ International Parallel and Distributed Processing Symposium, pp. 1-9.

Ngan, Non-Final Office Action, Jun. 5, 2008, U.S. Appl. No. 11/213,678, 16 pages.

Ngan, Final Office, Mar. 6, 2009, U.S. Appl. No. 11/213,678, 19 pages.

Ngan, Non-Final Office Action, Nov. 17, 2009, U.S. Appl. No. 11/213,678, 19 pages.

Ngan, Final Office Action, Jun. 24, 2010, U.S. Appl. No. 11/213,678, 9 pages.

Ngan, Final Office Action, Apr. 1, 2011, U.S. Appl. No. 11/213,678, 8 pages.

Ngan, Non-Final Office Action, Oct. 28, 2010, U.S. Appl. No. 11/213,678, 9 pages.

Havemose, Non-Final Office Action, Apr. 17, 2009, U.S. Appl. No. 12/334,644, 11 pages.

Havemose, Final Office Action, Nov. 9, 2009, U.S. Appl. No. 12/334,644, 14 pages.

Havemose, Non-Final Office Action, Apr. 1, 2010, U.S. Appl. No. 12/334,644, 14 pages.

Havemose, Final Office Action, Dec. 2, 2010, U.S. Appl. No. 12/334,644, 21 pages.

Havemose, Non-Final Office, Mar. 31, 2011, U.S. Appl. No. 12/334,644, 14 pages.

Havemose, Final Office Action, Oct. 19, 2011, U.S. Appl. No. 12/334,644, 5 pages.

Havemose, Non-Final Office Action, Sep. 26, 2012, U.S. Appl. No. 13/462,997, 19 pages.

Havemose, Final Office Action, Apr. 23, 2013, U.S. Appl. No. 13/462,997, 19 pages.

Dictionary definition of "interrupt handler", retrieved from http://en.wikipedia.org/wiki/Interrupt_handler on Jan. 11, 2014.

Dictionary definition of "kernel", retrieved from http://en.wikipedia.org/wiki/Kernel_(computing) on Jan. 11, 2014.

Dictionary definition of "kernel", retrieved from http://en.wikipedia.org/wiki/System_call on Jan. 11, 2014.

* cited by examiner

METHOD AND SYSTEM FOR PROVIDING HIGH AVAILABILITY TO COMPUTER APPLICATIONS

CROSS-REFERENCE TO RELATED APPLICATIONS

This application is a continuation of U.S. patent application Ser. No. 13/866,431, filed Apr. 19, 2013, now issued as U.S. Pat. No. 8,959,395, which is a continuation of U.S. patent application Ser. No. 13/229,864, filed Sep. 12, 2011 now issued as U.S. Pat. No. 8,458,534, which is a continuation of U.S. patent application Ser. No. 12/334,651 filed on Dec. 15, 2008 now issued as U.S. Pat. No. 8,037,367, which is a continuation of U.S. patent application Ser. No. 11/213,678, filed Aug. 26, 2005, now issued as U.S. Pat. No. 8,122,280, which claims priority from U.S. Provisional Application Ser. No. 60/605,026 filed on Aug. 26, 2004; these applications incorporated herein by reference in their entirety.

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R §1.14.

BACKGROUND OF THE INVENTION

1. Field of the Invention

This invention pertains generally to enterprise computer systems, embedded computer systems, and computer systems in general, and more particularly to methods, systems and procedures for providing high availability service and automatic fault detection and recovery for computer applications.

2. Description of Related Art

High Availability (HA) for complex computer applications is a non-negotiable requirement for the Internet, corporate data centers, financial services, telecommunications, government systems and medical systems. At the same time, the effort involved in actually achieving such availability and reliability can be one of the most expensive and time-consuming aspects of application development and can even cause delay in deploying an application. Typically, High Availability is provided through custom applications, custom operating systems or custom hardware, all of which are expensive and proprietary.

Therefore, there is a need for methods, systems and procedures for achieving high availability and reliability through a transparent and automatic software infrastructure, rather than through prolonged custom coding, lengthy development time and substantial expenditure.

BRIEF SUMMARY OF THE INVENTION

The present invention comprises a set of system-level high availability services for computer systems. In an exemplary embodiment, a method for distributed fault detection is provided. In the method, unplanned application exits and crashes may be detected at a node local level. Further, application hangs may be detected using at least one of a script and a binary at the node local level. Also, node crashes and operating system crashes may be detected using node to node heartbeating. The invention may function in general terms like an extension of the operating system. By providing High Availability at the system-level, the invention enables high availability without requiring modifications to the applications or the operating system kernel.

By way of example, and not of limitation, the present invention implements high availability for stateless applications (for example, sendmail) and stateful applications (for example, Voice Over IP applications) automatically and transparently, without any application source code modifications. In one embodiment, the invention also provides a set of optional APIs that allow the application to have increased control as desired over the high availability that the invention provides.

According to an aspect of the invention, the application being protected runs on a primary server and has one or more designated backup servers ready to take over in the event of a fault.

A system can be configured according to the invention with any number of server nodes upon which one or more application programs for a client can be executed. A primary copy of the application runs on the first server, while a backup copy of the application awaits on a second server to be executed in response to an application failover procedure. The primary and second copy of the application can be loaded on different servers, or even on the same server.

The invention provides layered high availability, with both system level and application level functionality and modules. The application is under control of the application-level module which communicates with the system-level module. By way of example, the system-level module and application-level module are referred to herein, respectively, as an Availability Manager (Duration AM) and a Duration Interface (Duration IF). The Duration IF contains the registration code for running and protecting the application. Communication links couple each of the Duration IFs to the local AM. The Duration AM for each local system preferably couples to the system library layer and both a TCP control layer (i.e., TCPF) for managing the TCP connection state at the kernel level, and a kernel module (i.e., KState) for collecting kernel state information. The above elements operate over an operating system, preferably an operating system such as a Linux, or other operating system providing sufficient process support. The failover operations of the system are preferably controlled in response to a set of policies (i.e., Policy Files) coupled to each local system.

By way of example, and not of limitation, the invention implements stateless or stateful failover of an application from a primary server to its designated backup server if the application crashes or malfunctions on the primary server. The failure is detected automatically and recovery is initiated automatically without any application involvement.

According to an aspect of the invention, there is a clean separation of the application logic from the high availability code. Application programmers can focus on writing their application code, rather than on writing high availability code, and an administrator can make applications highly available by simply configuring the desired settings, such as by using a graphical configuration tool implemented according to the invention. The result is that high availability applications are developed easily and deployed quickly without the necessity of custom coding.

According to another aspect of the invention, protection is provided against node faults, network faults and process faults. In this context, an "anode" means a processor running a single copy of an operating system and one or more applications. The present invention provides user-controlled system management, automatic availability management, and publish/subscribe event management, including notification of faults and alarms.

In various embodiments of the invention, features are provided that are useful for applications that must be highly available, including but not limited to:

(a) Stateful High Availability for Enterprise applications such as Web Servers, Application Servers, Email Servers, Databases and DNS Servers Voice over IP (VOIP), Session Initiation Protocol (SIP), Streaming Media and Gaming Servers;

(b) Configurable protection levels;
(c) Local and Remote restart;
(d) Local and Remote stateful restore;
(e) Transparent and coordinated multi-process and multi-threaded application checkpointing;
(f) Full and incremental checkpointing;
(g) Checkpoint to either local or shared disk;
(h) Automatic and Transparent Fault Detection;
(i) Node fault detection;
(j) Process fault detection;
(k) Process and application deadlock and hang protection through external health checks;
(l) Automatic and Transparent Recovery;
(m) Automatic restart of failed processes;
(n) Automatic failover of failed nodes;
(o) Automatic migration of processes to their home location after repair of failed node;
(p) Subscription-based fault notification;
(q) Auto-startup of application;
(r) Start/Stop/Re-Start script support;
(s) Dynamic policy updates;
(t) Upgrades and provisioning; and
(u) User-controllable migration of processes.

The invention can be practiced according to various aspects and embodiments, including, but not limited to, those described in the following aspects and embodiments which are described using phraseology which is generally similar to the claim language.

According to an aspect of the invention a method for achieving transparent integration of an application program with a high availability protection program comprises: (a) injecting registration code, transparently and automatically, into an application program during launch, without the need of modifying or recompiling the application program and without the need of a custom loader; (b) registering the application program automatically with the high availability protection program; (c) detecting a failure in the execution of the application program running on a primary server; and (d) executing the application program from one or more designated backup servers automatically in response to the failure.

According to another aspect of the invention, a method, system, improvement or computer program for performing lossless migration of an application program from a primary node to a backup node and while being transparent to a client connected to the primary node over a TCP/IP connection, can be implemented by: (a) loading a kernel module comprising a dummy device driver; (b) executing a checkpointing procedure for the application to invoke the kernel module for capturing the state of TCP connections that are open for that process and sending the connection state to the checkpointing procedure and to a backup server node in conjunction with application state; and (c) executing application restoration procedures to invoke the kernel module for restoring the backup server node to restore TCP connections in the exact state as they were in the primary server. In one embodiment, the kernel module hooks into the TCP/IP stack during checkpointing and restoration and freezes the entire connection and the client experiences a connection delay during the time the process is checkpointed and restored on the backup node.

According to another aspect of the invention, a computer executable program for lossless migration of an application program from a primary node to a backup node which is transparent to a client connected to the primary node over a TCP/IP connection comprises: (a) a loadable kernel module comprising a dummy device driver; (b) an application checkpointing procedure configured for invoking the kernel module for capturing the state of all the open TCP connections for that process and communicating the connection states back to the checkpointing procedure and to a backup node along with the application state; and (c) an application restoration procedure configured for invoking the kernel module to restore all the TCP connections in the exact same state as they were in the primary node. In one embodiment, the kernel module hooks into the TCP/IP stack during checkpointing and restoration and freezes the entire connection and the client experiences a connection delay during the time the process is checkpointed and restored on the backup node.

According to another aspect of the invention, there is described a method, system, improvement and computer program for achieving transparent integration of an application program with a high availability protection infrastructure, that transparently and automatically injects registration code (called "et init( )") into an application program during launch; wherein the application program automatically registers with the high availability protection program; wherein modification of the application program or application program recompilation is not required; and wherein a custom loader is not required. In one embodiment, un-registration of the application program from the high availability program is monitored and deemed a normal exit. For example, in one embodiment the registration code is contained in a duration interface layer (i.e., Duration IF) running in the applications process.

According to another aspect of the invention, there is described a method, system, improvement and/or computer program for maintaining a client connection to an application program in a multimode network, comprising assigning a virtual IP address to one or more application programs hosted on a first node; wherein the virtual IP address is retained by an application program when the application program is migrated to a second node. In one mode each the application program is assigned a unique virtual IP address. In another mode, one or more groups of application programs are assigned a unique virtual IP address. In a preferred embodiment, assignment of a virtual IP address is transparent to an application program; and migration of an application program from the first node to the second node is transparent to a user.

Another aspect of the invention is a method, system, improvement and/or computer program that provides a mechanism to ensure that processes that comprise an application program are launched in the proper order, and with the proper timing constraints during recovery. In one embodiment, a mechanism is also provided to ensure that application programs are recovered in the proper order.

In accordance with a further aspect of the invention, there is described a method, system, improvement and/or computer program for providing a mechanism to configure the high availability characteristics of an application program through a graphical user interface (GUI) without requiring any modification or recompilation of the application program. The configuration data is contained in a "PF" (Policy File) local to each system.

Another aspect of the invention is a method, system, computer program, computer executable program, or improvement wherein user controllable launch of processes and applications is provided.

Another aspect of the invention is a method system, computer program, computer executable program, or improvement wherein user controllable stop of processes and applications is provided.

Another aspect of the invention is a method, system, computer program, computer executable program, or improvement wherein storage checkpointing is provided.

Another aspect of the invention is a method, system, computer program, computer executable program, or improvement wherein storage checkpointing synchronized with process checkpointing is provided.

Another aspect of the invention is a method, system, computer program, computer executable program, improvement as recited in any of the preceding claims, wherein profiling of running applications is provided to determine optimal policy settings.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

DETAILED DESCRIPTION OF THE INVENTION

Referring more specifically to the drawings, for illustrative purposes the present invention will be described in relation to FIG. 1 through FIG. 4. It will be appreciated that the system and apparatus of the invention may vary as to configuration and as to details of the constituent components, and that the method may vary as to the specific steps and sequence, without departing from the basic concepts as disclosed herein.

1. INTRODUCTION

The context in which this invention is described is an application program which is running on a primary server with one or more designated backup servers. Without affecting the general case of multiple backups, the following describes scenarios with one primary and one backup per application. Multiple backups are handled in a similar manner as a single backup. As a shorthand notation, the invention will generally be referred to herein as "Duration" or "Duration module".

Figure 1:
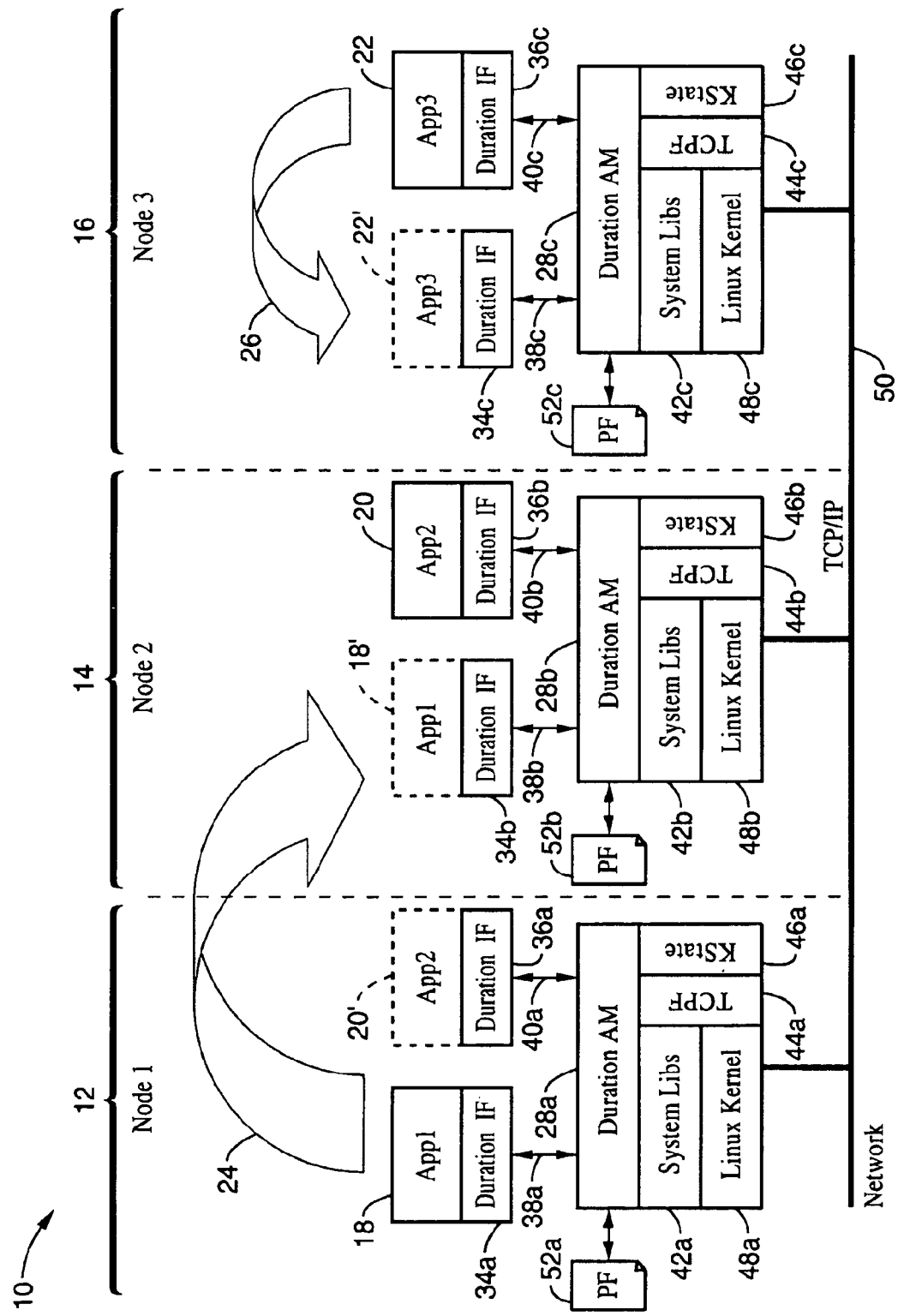
FIG. 1 is a block diagram of a three-node system having three high availability (HA) protected applications according to an embodiment of the present invention.

FIG. 1 illustrates, by way of example, a system setup 10 with three nodes 12, 14, and 16 and three different applications 18, 20, and 22. In this example, the primary copy of the first application App1 18 is on Node1 12 and its backup copy 18' is on Node2 14. The primary copy of application App2 20 is on Node2 14 and its backup copy 20' is on Node1 12. The primary copy of application App3 22 and its backup 22' copy are both on Node3 16. For the sake of illustration, the primary/backup relationship is indicated for App1 and App3 with block arrows 24 and 26 where the primary is at the beginning of the block arrow and the tip of the arrow points to the backup.

Availability Managers (Duration AM) 28a, 28b, and 28c are shown coupled to Duration Interfaces (Duration IF) 34a and 36a, 34b and 36b, and 34c and 36c, respectively, in which the registration code is contained for running the applications process. Communication links 38a, 40a, 38b, 40b, 38c, 40c are shown coupling corresponding local Duration AMs and Duration IFs.

Duration AMs for each local system are shown coupled to corresponding System Libs layers 42a through 42c. Also coupled to the Duration AM layers are corresponding TCPF modules 44a through 44c which manage the TCP connection state at the kernel level, and the kernel KState modules 46a through 46c which collect the above mentioned general kernel state. Corresponding Linux Kernels 48a through 48c are shown at each of the lower layers coupled to network 50. In addition, Policy Files (PF) 52a through 52c are shown coupled to each local system.

2. LOADING OF APPLICATIONS AND SHARED LIBRARIES

In order for the invention to provide High Availability (HA) Services for a given application, the system is configured to allow the application to register for High Availability services/protection in some manner. Similarly, the application is configured to provide an un-register process prior to terminating in order to indicate successful completion.

Conventionally, creating a program that is "HA aware" has required that a programmer add custom code to the application followed by compilation and linking However, as the "end user" of an application program does not have access to the source code, this mechanism only has limited functionality.

The present invention, however, provides the HA functionality within a set of system-level services, such as provided in the form of shared libraries. Shared libraries are supported by all modern operating systems, such as Linux, Unix, Windows, LynxOS, and Apple OSX. Shared libraries are initialized through standard calls, which are referred to herein as "_init( )" in the following description.

Figure 2:
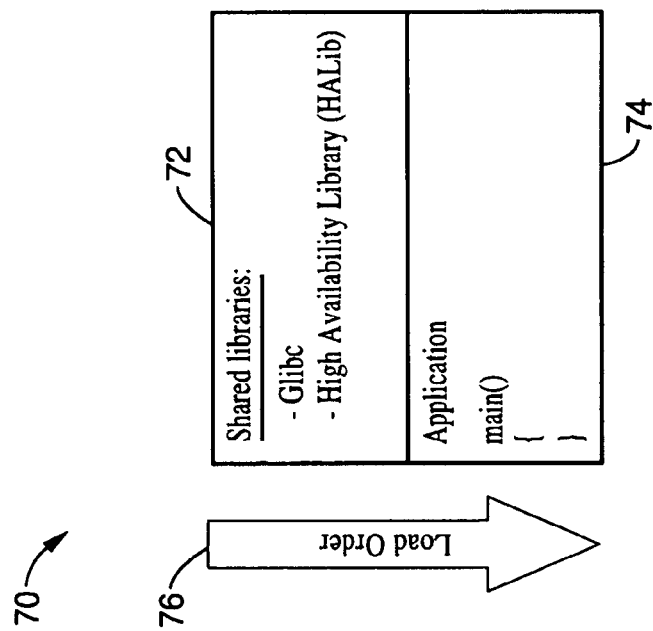
FIG. 2 is a block program listing of the order in which the Linux operating system loads an application according to an aspect of the present invention, showing loading of operating system, libraries, and executable.

FIG. 2 illustrates the loading process 70 of system libraries. In this example, first the operating system loads the shared system libraries 72, then the shared application libraries, and finally the application executable itself 74. By way of example, and not of limitation, the figure describes the two steps of the Linux loader 76:

1. Loading and initialization of shared libraries 72, including system libraries such as glibc, and other shared libraries.

2. Loading of the application executable and calling main( ) to start the application 74. In this regard, it is important to note that the invention provides HA services that are loaded and activated during step #1; namely, as a shared library. In the description herein, the term HALib is used to refer to a group of libraries providing the core HA services, such as automatic registration, automatic un-registration, checkpointing, fault detection, virtual IP addresses, fault recovery, and the kernel module library interface.

3. AUTOMATIC REGISTRATION

Registration is provided in this embodiment by the _init( )) function of the shared HALib library. The _init( )) function initializes the High Availability services for the application process and registers the process with the HA infrastructure. The initialization and registration occurs before any part of the application has been loaded.

By way of example, and not of limitation, the following is a pseudo code implementation of _init( )) as provided in the HALib.

```
void init( )
{
    // register with HA services
    // initialize checkpointing
    // initialize fault detection
    // initialize Virtual IP addresses
    // initialize kernel module interface
    // initialize recovery services and other HA Services
    // register exit handler
}
```

As short-hand for the content of the _init( )method above, the invention uses the name "et init( )".

4. AUTOMATIC UN-REGISTRATION

The invention provides un-registration to handle the case where the application has finished processing and wants to do a "planned" exit. If the application crashes or faults through some other means, indicative of an "unplanned" exit, then the system is configured to initiate recovery.

By way of example, and not of limitation, the following is a pseudo code implementation of the exit handler( )) as provided in HALib.

```
void exit handler(int exit code, void *arg)
{
    // un-register with HA Services
    // shut down of checkpointing
    // shut down of fault detection
    // shutdown of Virtual IP addresses
    // shutdown of kernel module interface
    // shutdown of other recovery services
}
```

5. PRE-LOADING OF SHARED LIBRARIES

To ensure that the registration and un-registration is handled automatically every time an application is loaded, the invention ensures that the HA libraries are available and loaded prior to application launch. This is achieved for example, by utilizing the preload capabilities of the system loader. By preloading the HA libraries, the invention also enables the HA library to replace or enhance functionality in other shared libraries or system libraries. By way of example, and not limitation, the Linux loader enables preloading of libraries by use of the LD PRELOAD environment variable. Library HALib gets preloaded by setting LD PRELOAD=I<full path>IHALib.so, exporting the LD PRELOAD environment variable, and then loading the application.

By way of example, and not limitation, the bash Unix shell facilitates a combination of all three steps above into one step. An example command line to load App1 would be:
>LD PRELOAD=/<full_path>IHALib.so App

6. FULL TRANSPARENCY

Figure 3:
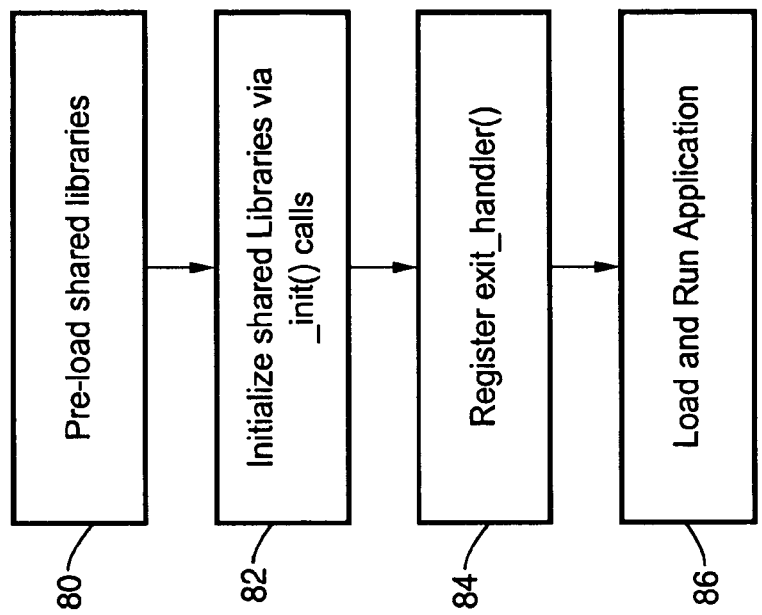
FIG. 3 is a flow diagram of the Linux operating system loading an application and its shared libraries according to an aspect of the invention, showing the events necessary to ensure transparency.

FIG. 3 illustrates steps according to an embodiment of the invention for providing fully transparent and automatic High Availability services by utilizing the three elements described above. Represented by block 80 is pre-loading of HALib performed for each application, ensuring HA Services are loaded prior to the application. In block 82 automatic initialization is performed on the shared libraries as they are loaded by the system loader using standard init( ) calls. In block 84 registration of exit handler( ) is performed. Loading and execution of the application is performed in block 86.

7. FAULT DETECTION

Detecting that the application has failed is one of the core components in the invention. There are three general classes of faults that the invention protects against:
1. Node faults, where a server crashes or reboots;
2. Unplanned Application exits, where application exits unexpectedly; and
3. Application hangs, where application is non-functional or not performing correct operations.

Node faults are detected using heart-beats and general communication between the Duration AMs 28a through 28c (FIG. 1) on each node. By way of example, and not limitation, Duration AM 28a on Node112 communicates and ensures operational integrity of all nodes that are failover targets for applications running on Node128b. By way of example, the Duration AM 28a on Node112 communicates with the Duration AM 28b on Node214 to ensure availability of App118. The Duration AM 30 on Node214 communicates with the Duration AM 28a on Node112 to ensure the availability of App220. The AM 28c on Node316 does not communicate with other AMs, as App322 is protected locally on Node316 only.

Unplanned application exits are detected by the local AM on the system where the application is running when the communication link between the local AM and the Duration IF is broken. Referring to FIG. 1 for illustrative purposes, the communication link 38a for App118 goes between the local AM 28a and Duration IF 34a.

Application hangs are detected as the system is configured for performing health-checks on the system where the application is running. The health-check invokes some feature or component of the application and if an invalid result is produced, creates a fault event. Health check can be any executable, script or macro that is capable of calculating and returning integer values of {0, 1, −1, 2, −2} and so forth. In one aspect of the invention, the health-check is a binary executable that returns a value of zero if successful or non-zero if a fault is detected. In another aspect of the invention, the health-check is a script that returns zero if successful or non-zero if a fault is detected.

8. VIRTUAL IP ADDRESSES

The majority of modern networked computers use TCP/IP for network communication, wherein each network interface card (NIC) is assigned a unique IP address, and each computer has one or more NICs. Accordingly, the invention readily can be implemented over a TCP/IP based network. The uniqueness of IP addresses on the network follows the following rules: (1) each IP address is different from all other IP addresses visible to the computer, and (2) the protocol supports having two or more IP addresses assigned to the same NIC. In the following discussion the described NIC IP address is designated as NIC IP. While the NIC IP can be used to address the system, it ultimately belongs to the NIC in the system, not individual applications or other higher level components.

In general, a network application listens on a port on a given IP address for incoming connections. Using the NIC IP as the contact IP for the application generally leads to problems, since the NIC IP is bound to the hardware NIC in the system. If the application fails on the primary and has to be restored on the backup server, the NIC IP will have to be moved, which is generally not possible without disrupting all other running programs, including the operating system, on the primary server.

The present invention addresses this fundamental issue by using a technique of Virtual IPs. The invention assigns unique IP addresses for the individual application under protection. This application-specific IP address is referred to herein as a Virtual IP (VIP). If the application fails on the primary and gets moved to the backup, the VIP simply gets moved with the application, thereby ensuring that clients communicating with the application on the VIP are not cognizant of the fact that the application was moved from the primary to the backup. While the clients generally have to reconnect to re-establish the connection, the reconnect transparently connects to the backup server, without the client being aware that the application was failed over.

The Virtual IP is assigned, sometimes also called "aliased" herein, to a NIC in the system, where the application is running. By way of example, conditions on this assignment process may include the following. If a group of applications all use the same VIP, all applications in the group have to run on the same system since each VIP is unique and only can be mapped to one NIC. If a group of applications all use the same VIP and one of the applications fails over to the backup location, the invention will automatically move the other members of the group to the backup location.

9. USE OF VIRTUAL IP ADDRESSES FOR HIGH AVAILABILITY

By way of example, and not limitation, consider the scenario where an application uses VIP__1 on the primary server. If the application crashes and needs to be restored on the backup server, the invention removes the VIP__1 alias from the primary server and subsequently aliases VIP.sub.--1 to a NIC in the backup server. The application remains responsive on VIP__1 with the same port-number, wherein the failover is complete.

The invention renders the application location independent by utilizing VIPs, since the application can be addressed independently of the server upon which it is running at any given point in time. The invention ensures that the assignment of VIPs and re-assignment upon failover to a backup server is provided as a system level function, and therefore is transparent to the applications under HA protection.

Another aspect of the invention uses the VIP to determine if more than one copy of a given application is launched at any given time. If the invention detects two instances of a VIP, one of the duplicates of the application will be forcefully terminated.

10. USE OF VIRTUAL IP ADDRESSES FOR MIGRATION

As described under the previous section "Use Of Virtual IP Addresses For High Availability", the VIP is automatically and transparently moved with the application upon a failover, as part of the failover mechanisms.

In the same manner, if the system administrator migrates an application, such as manually initiating a move of the application without a fault, the VIP are automatically and transparently moved.

11. LAUNCH ORDER OF MULTI-PROCESS APPLICATIONS

A Multi-process application consists of multiple independent processes, each performing a part of the application. Generally, when a multi-process application is launched a strict launch-order must be observed. The invention automatically tracks the processes as they are launched and maintains a data structure containing the launch history. This data structure is used upon failover and recovery to re-launch the processes in the correct order. In one mode, the invention allows the user to specify the launch order of processes as well, such as using the graphics management interface of the present invention. The management interface can be used to order the process in the order of first-to-last to ensure any particular launch order. In addition, one mode of the invention is configured to allow the user to specify the relative timing of the various processes, thereby ensuring a proper launch.

12. DURATION CONFIGURATION TOOL (DCT)

It will be appreciated that network and related operational settings for the invention can be entered in various conventional ways, since the invention is implemented in software. For example, a graphics user interface (GUI) could be provided to configure all the high availability characteristics for all applications. In another embodiment, access could be provided through a command line interface (CLI). Such interfaces would be easily implemented in software to provide access to the features described herein.

More particularly, a Duration Configuration Tool (DCT) is provided to allow for easy configuration of applications and their associated policies, such as checkpointing options, health checks, node-lists, VIP addresses, etc. When the administrator uses the DCT to make a change in the system, the changes are deployed by the Availability Managers on all the nodes. The DCT also provides a live view of the current configuration and system status, including running nodes and applications. In addition, applications can be launched and migrated, nodes rebooted or added, and fault reports reviewed.

13. TCP CONNECTION FAILOVER AND MIGRATION

Figure 4:
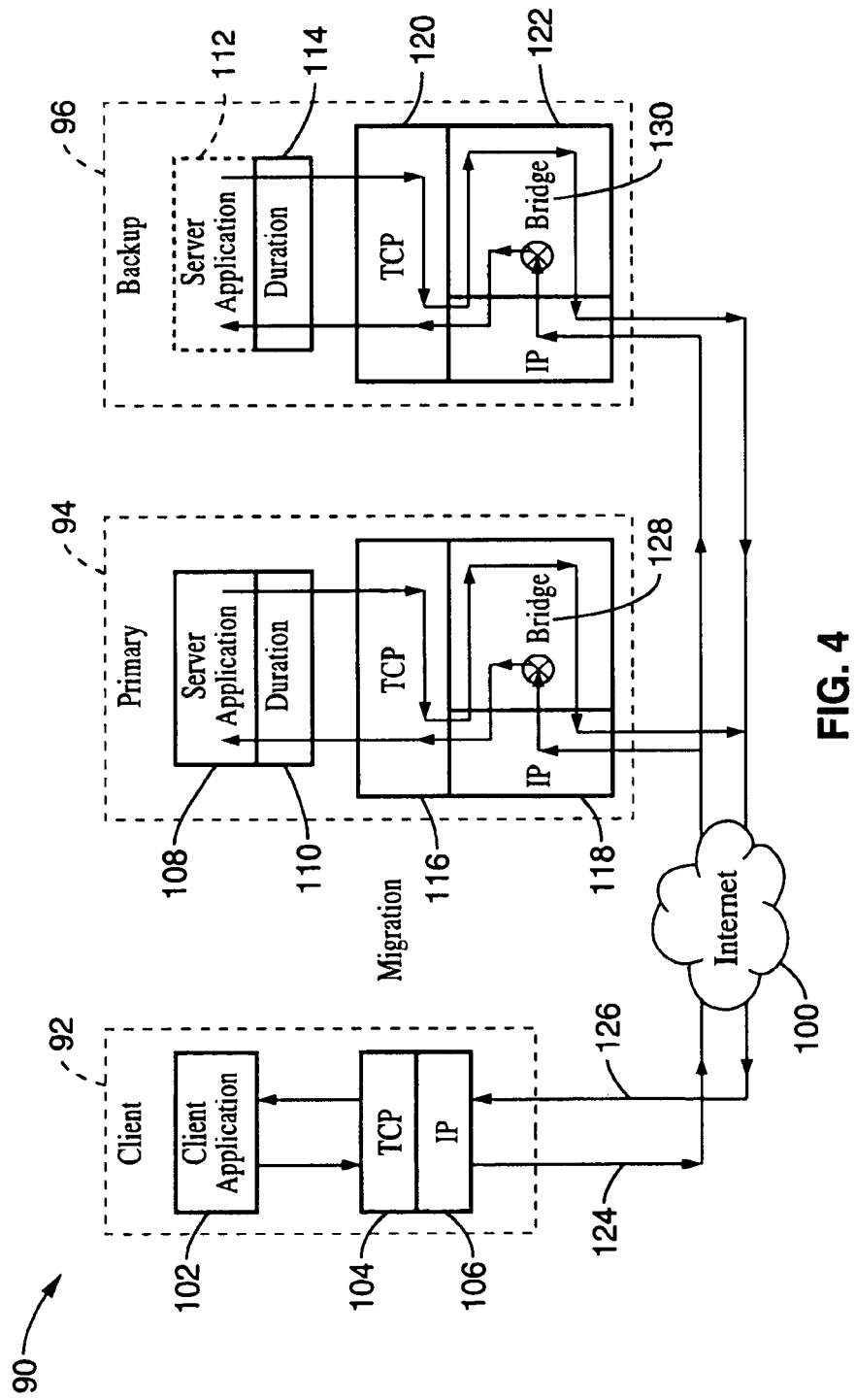
FIG. 4 is a block diagram of programming the internals of the TCP Connection Failover and Migration according to an aspect of the present invention.

FIG. 4 illustrates an example of a system configuration 90 showing connectivity between client 92 a primary server 94 and a backup server 96 over a communications medium 100, such as the Internet. A client application 102 is shown which communicates with primary sever 94 through TCP/IP layers 104, 106 via the Internet 100, and ostensibly with backup server 96 after failover. Primary server 94 is shown with a server application 108 coupled to Duration 110 as described herein above a TCP layer 116 and an IP layer 118. Similarly, backup server 96 is shown with server application 112 coupled to Duration 114 above a TCP layer 120 and an IP layer 122.

It will be appreciated that maintaining connectivity is an important practical aspect of high availability. If a client application 102 at client 92 is connected through TCP/IP 104, 106 to an application 108 protected by the invention and a fault and recovery is initiated, then traditionally the TCP/IP network connection 124, 126 is lost. This is an artifact of how TCP/IP works: if the NIC IP changes, the TCP/IP networking stack will disconnect, forcing a client reconnect. Alternatively, if the application is restarted, client connections also have to be re-established.

The invention addresses this issue by providing TCP/IP connection failover, thereby ensuring that client connections 124, 126 are maintained across a migration of the server application from the primary to the backup. By way of example, and not limitation, FIG. 4 illustrates an example where a client application 102 is connected via TCP/IP 104, 106 on client system 92, to the primary server application 108 running in server 94. TCP/IP traffic is delivered via connection 124, and arrives at the IP layer 118 at primary server 94 wherein it gets routed through the IP bridge 28, to the TCP layer 116, finally arriving at the server application 108 under control of Duration 110 on the primary. For incoming network traffic, bridge 128 captures all internal state of TCP and IP and the forwards the network data to the TCP stack 116 and the Bridge 130 on backup server 96. On primary server 94 the network traffic is delivered by the TCP stack 116 to Duration 110 and server application 108. The bridge 128 on FIG. 4, is called TCPF (44a-44c) in FIG. 1.

On the primary server 94 the bridge 128 and Duration 110 coordinates when the state is captured. This coordination ensures that the state of the server application 108 is captured at the same time as the state of the TCP/IP connection in bridge 128.

The bridge 128 and Duration 110 on the primary server transmit the combined state of the server application 108 and the bridge 128 to the backup server 96. The combined state is shared between the bridge 130 on the backup, the backup server application 112, and Duration 114.

The bridge 130 on backup server 96, with assistance from Duration 114 on backup server 96, stores copies of the TCP and IP stack state for use upon restoration of TCP/IP connections at the backup. The bridge 130 on backup server 96 in combination with the server application state, allows the Duration 114 on backup server 96 to perform a stateful migration of the server application from primary application execution 108 to a backup application execution 112 with preservation of client 92 TCP connections 124.

By way of example, and not limitation, the system can be configured for the bridging actions according to the following. The system can be configured for collecting the IP and TCP states for later use. For example the states can be loaded into a byte buffer which is transmitted to the backup, and stored in the byte buffer of the backup for future use. The collected TCP state information preferably includes TCP sequence numbers and TCP window sizes. The collection of IP and TCP state is preferably provided in a loadable kernel module. The kernel modules are inserted as a bridge between IP and TCP in the TCP/IP stack. The loadable kernel module is called from, for example, a system checkpointer, which makes the TCP/IP connection migration transparent and automatic.

An aspect of the invention is that the bridge module 128 sits within the IP layer 118 under TCP 116, wherein the TCP layer is unaware of the bridge and its migration functionality. During migration from primary to backup, programming according to the invention is configured to "freeze" the networking connection to ensure no messages are being sent to, and processed by, the "old" primary while the backup is in the process of taking over. The client side will experience a minor delay while the network connection is frozen. Generally the delay is less than a second, but could be larger depending on processor speed, memory, CPU utilization and other factors. Connection will automatically resume once the IP and TCP stacks have been restored to the state of the primary for the connections being protected.

In one mode of the system storage checkpointing and synchronizing storage checkpointing with process checkpointing is performed. In one aspect the storage checkpointing procedure notifies the kernel module which captures the state of the open TCP connections for the checkpointing procedure.

14. LOSSLESS MIGRATION

The invention combines the VIP and TCP Connection failover to provide lossless migration of applications with stateful client connections. If there are no stateful client TCP Connections the invention provides lossless migration without requiring TCP Connection migration.

15. POLICY MANAGEMENT

One aspect of the invention addresses the issue of determining "optimal" settings for the various High Availability parameters by providing a "built-in" profiler. The profiler monitors application execution, and builds a statistical description of the execution which is used for generating and/or recommending optimal settings. The profiling process is preferably performed transparently and automatically, with no administrator intervention necessary. According to one mode, the administrator can later select which of the recommended configuration changes to apply. The invention can be configured for another mode, in which the administrator dynamically adjusts parameters on a live system. By way of example, and not limitation, this may include changing of heart-beat frequency, checkpointing interval, health-checks, start/stop/restart scripts, and so forth.

16. STARTING AND STOPPING APPLICATIONS

The invention supports starting and stopping of an application both as if it were launched from the command line and as if it were launched with scripts. One aspect of the invention provides application launching that emulates launching the application from a command line. One way of implementing this case is by configuring the command line arguments via the management interfaces and automatically forwarding them to the launched application via the Duration AM.

A number of different aspects can be implemented within an embodiment of the invention for starting and stopping. The following are provided by way of example and not limitation: (1) Launching the application in accord with the standard Linux START/RESTART/STOP launch and termination scripts. In this case the invention parses the START/RESTART/STOP scripts and interprets environment variable and configuration data for use by the invention. (2) Launching the application (START) through a custom written executable, such as shell scripts, Perl scripts, expect scripts, php, and so forth. (3) Application restarting (RESTART) can be executed through a custom written executable, such as shell scripts, Perl scripts, expect scripts, php, and so forth. (4) Terminating the application (STOP) through a custom written executable, such as using shell scripts, Perl scripts, expect scripts, php, and so forth. (5) Performing an "AutoStartup" in which the programming automatically launches HA services for pre-configured application upon initial booting or rebooting of the system. (6) Ensuring that the application with AutoStartup enabled only gets launched on the primary server, even if the backup server comes up first.

17. CONCLUSION

The present invention comprises a system, apparatus and method of providing high availability services over a connection medium, or network, such as the Internet. The system invention allows application programming and connection failover from a primary to a secondary server, as well as restoration. An embodiment of programming is described for various layers within the system. It should be recognized that these descriptions are provided by way of example and that one of ordinary skill in the art can modify the implementation of the system without departing from the teachings of the present invention.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method comprising:
   pre-loading one or more fault detectors for a first application into an address space of the first application on a first node,
      wherein modification of the first application is not required and
      wherein recompilation of the first application is not required;
   registering the first application with a high availability protection program;
   using the high availability protection program and the one or more fault detectors to detect a fault relating to the first application;
   responsive to detecting the fault, restarting the first application and preserving at least one TCP connection to the first application across the restart; and
   after the first application has finished processing, un-registering the first application from the high availability protection program and shutting down the one or more fault detectors.

2. The method according to claim 1, wherein the fault that is detected is an application hang fault, wherein a health-check invokes a feature of the first application and determines that an invalid result is produced.

3. The method according to claim 1, wherein the high availability program is executing on a second node that is different from the first node, wherein the fault that is detected is a node fault, wherein heart-beat communications are used between the first node and the second node to detect the node fault.

4. The method according to claim 3, further comprising,
   in response to the detection of the node fault, migrating execution of the first application to a backup application execution on a backup node.

5. A method comprising:
   pre-loading one or more fault detectors for a first application into an address space of the first application on a first node,
      wherein modification of the first application is not required and
      wherein recompilation of the first application is not required;
   registering the first application with a high availability protection program;
   using the high availability protection program and the one or more fault detectors to detect a fault relating to the first application,
   wherein the fault that is detected is an unplanned application exit fault, wherein there is a determination that a communication link is broken between the high availability protection program and the first application; and
   responsive to detecting the fault, restarting the first application and preserving at least one TCP connection to the first application across the restart.

6. A method comprising:
   pre-loading one or more fault detectors for a first application into an address space of the first application on a first node,
      wherein modification of the first application is not required and
      wherein recompilation of the first application is not required;
   registering the first application with a high availability protection program;
   using the high availability protection program and the one or more fault detectors to detect a fault relating to the first application;
   responsive to detecting the fault, restarting the first application and preserving at least one TCP connection to the first application across the restart;
   assigning the first application a unique virtual IP address;
   determining that there is a second instance of the unique virtual IP address assigned to a duplicate application of the first application, and
   in response that the determination, terminating the duplicate application.

7. A method comprising:
   pre-loading one or more fault detectors for a first application into an address space of the first application on a first node,
      wherein modification of the first application is not required and wherein recompilation of the first application is not required;
registering the first application with a high availability protection program;
using the high availability protection program and the one or more fault detectors to detect a fault relating to the first application;
responsive to detecting the fault, restarting the first application and preserving at least one TCP connection to the first application across the restart;
assigning a virtual IP address to the first application;
establishing a TCP/IP connection to the first application;
capturing a connection state for the TCP/IP connection;
responsive to detecting the fault, performing a lossless migration of the first application from the first node to a backup node, wherein
the restarting of the first application occurs on the backup node, and
using the captured connection state and the virtual IP address to restore the TCP/IP connection to the first application.

8. A non-transitory computer-readable storage medium including a computer program having instructions for:
pre-loading one or more shared libraries for a first application,
wherein modification of the first application is not performed and
wherein recompilation of the first application is not performed;
prior to loading the first application, the shared libraries registering the first application with a fault protection program;
prior to loading the first application, the shared libraries initializing one or more fault detectors;
establishing a connection to the first application;
capturing a connection state for the connection to the first application;
the fault protection program and the one or more fault detectors detecting a fault relating to the first application; and
responsive to detecting the fault, restarting the first application;
responsive to detecting the fault, the connection state being used to restore the connection to the first application;
assigning the first application a unique virtual IP address,
determining that there is a second instance of the unique virtual IP address assigned to a duplicate application of the first application; and
in response that the determination, terminating the duplicate application.

9. The non-transitory computer-readable storage according to claim 8, wherein the fault that is detected is an application hang fault, wherein a health-check invokes a feature of the first application and determines that an invalid result is produced.

10. The non-transitory computer-readable storage according to claim 8, wherein the fault protection program is executing on a second node that is different from the first node, wherein the fault that is detected is a node fault, wherein heart-beat communications are used between the first node and the second node to detect the node fault.

11. The non-transitory computer-readable storage according to claim 10, further comprising,
in response to the detection of the node fault, migrating execution of the first application to a backup application execution on a backup node.

12. A non-transitory computer-readable storage medium including a computer program having instructions for:
pre-loading one or more shared libraries for a first application,
wherein modification of the first application is not performed and
wherein recompilation of the first application is not performed;
prior to loading the first application, the shared libraries registering the first application with a fault protection program;
prior to loading the first application, the shared libraries initializing one or more fault detectors;
establishing a connection to the first application;
capturing a connection state for the connection to the first application;
the fault protection program and the one or more fault detectors detecting a fault relating to the first application,
wherein the fault that is detected is an unplanned application exit fault, wherein there is a determination that a communication link is broken between the high availability protection program and the first application;
responsive to detecting the fault, restarting the first application; and
responsive to detecting the fault, the connection state being used to restore the connection to the first application.

13. A non-transitory computer-readable storage medium including a computer program having instructions for:
pre-loading one or more shared libraries for a first application,
wherein modification of the first application is not performed and
wherein recompilation of the first application is not performed;
prior to loading the first application, the shared libraries registering the first application with a fault protection program;
prior to loading the first application, the shared libraries initializing one or more fault detectors;
establishing a connection to the first application;
capturing a connection state for the connection to the first application;
the fault protection program and the one or more fault detectors detecting a fault relating to the first application;
responsive to detecting the fault, restarting the first application;
responsive to detecting the fault, the connection state being used to restore the connection to the first application; and
after the first application has finished processing, un-registering the first application from the fault protection program and shutting down the one or more fault detectors.

14. A non-transitory computer-readable storage medium including a computer program having instructions for:
pre-loading one or more shared libraries for a first application,
wherein modification of the first application is not performed and
wherein recompilation of the first application is not performed;
prior to loading the first application, the shared libraries registering the first application with a fault protection program;

prior to loading the first application, the shared libraries initializing one or more fault detectors;

establishing a connection to the first application;

capturing a connection state for the connection to the first application;

the fault protection program and the one or more fault detectors detecting a fault relating to the first application;

responsive to detecting the fault, restarting the first application;

responsive to detecting the fault, the connection state being used to restore the connection to the first application, assigning a virtual IP address to the first application; and responsive to detecting the fault, performing a lossless migration of the first application from a first node to a backup node, wherein the first application is restarted on the backup node, and the connection to the first application is restored using both the connection state and the virtual IP address.

15. A communication network system, comprising:

a first server structured with a processor for executing applications;

a second server in communication with the first server;

one or more fault detectors for a first application that are pre-loaded into an address space of the first application on the first server,
  wherein modification of the first application is not required and
  wherein recompilation of the first application is not required;

a high availability protection program that registers the first application, wherein the high availability protection program and the one or more fault detectors detect a fault relating to the first application, wherein the fault that is detected is an unplanned application exit fault, wherein a determination is made that a communication link is broken between the high availability protection program and the first application, and responsive to detecting the fault the first application is restarted, and at least one TCP connection to the first application is preserved across the restart.

16. The communication network system according to claim 15, wherein the high availability protection program is executing on a second server that is different from the first server.

17. The communication network system according to claim 15, wherein after the first application has finished processing, the first application un-registers from the high availability protection program and the one or more fault detectors are shut down.

18. The communication network system according to claim 15, wherein the first application is assigned a unique virtual IP address,
  wherein a determination is made that there is a second instance of the unique virtual IP address assigned to a duplicate application of the first application, and
  in response that the determination, the duplicate application is terminated.

19. The communication network system according to claim 15, further comprising,
  assigning a virtual IP address to the first application;
  establishing a TCP/IP connection to the first application;
  capturing a connection state for the TCP/IP connection;
  responsive to detecting the fault, performing a lossless migration of the first application from the first node to a backup node, wherein
  the restarting of the first application occurs on the backup node, and
  using the captured connection state and the virtual IP address to restore the TCP/IP connection to the first application.

* * * * *